United States Patent [19]

Bordeaux

[11] Patent Number: 4,852,170
[45] Date of Patent: Jul. 25, 1989

[54] REAL TIME COMPUTER SPEECH RECOGNITION SYSTEM

[75] Inventor: Theodore A. Bordeaux, Los Angeles, Calif.

[73] Assignee: R & D Associates, Marina Del Rey, Calif.

[21] Appl. No.: 944,468

[22] Filed: Dec. 18, 1986

[51] Int. Cl.$^4$ .............................. G10L 5/04; G10L 9/02
[52] U.S. Cl. ........................................ 381/41; 381/43; 381/50
[58] Field of Search .................................. 381/39–50, 381/52

[56] References Cited

U.S. PATENT DOCUMENTS

| | | | |
|---|---|---|---|
| 3,646,576 | 2/1972 | Griggs | 381/44 |
| 3,679,830 | 7/1972 | Uffelman et al. | 381/50 |
| 3,846,586 | 11/1974 | Griggs | 381/44 |
| 4,661,915 | 4/1987 | Ott | 381/44 |

OTHER PUBLICATIONS

James L. Flanagan, Speech Analysis Synthesis and Perception, Second Edition, 1972, pp. 69–72 and 140–149.
C. C. Tappert, "A Preliminary Investigation of Adaptive Control in the Interaction between Segmentation and Segment Classification in Automatic Recognition of Continuous Speech", IEEE Trans. on Systems, Man, and Cybernetics, Jan. 1972, vol. SMC-2, No. 1, pp. 66–72.
F. Jelinek, "Continuous Speech Recognition by Statistical Methods", IEEE Proceedings, vol. 64, No. 4, Apr. 1976, pp. 532–556.
Itahashi et al., "Discrete-Word Recognition Utilizing a Word Dictionary and Phonological Rules", IEEE Trans. on Audio and Electroacoustics, vol. AU-21, No. 3, Jun. 1973, pp. 239–249.

*Primary Examiner*—Gary V. Harkcom
*Assistant Examiner*—David D. Knepper
*Attorney, Agent, or Firm*—Poms, Smith, Lande & Rose

[57] ABSTRACT

Speech may be analyzed digitally and recognized in real time by a system which includes a spectrum analyzer which determines the frequency content of successive segments of speech. Each speech segment is logically analyzed to identify the class of phonemes of which it is a part, and then the frequency spectrum of the segment is analyzed to uniquely identify the specific phoneme within the type. Sequences of phonemes with transitions excluded can then be compactly stored, transmitted to remote locations, synthesized into voice and translated logically into English or other natural language.

24 Claims, 10 Drawing Sheets

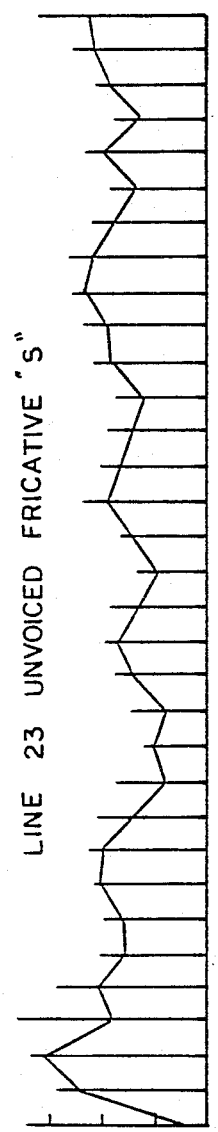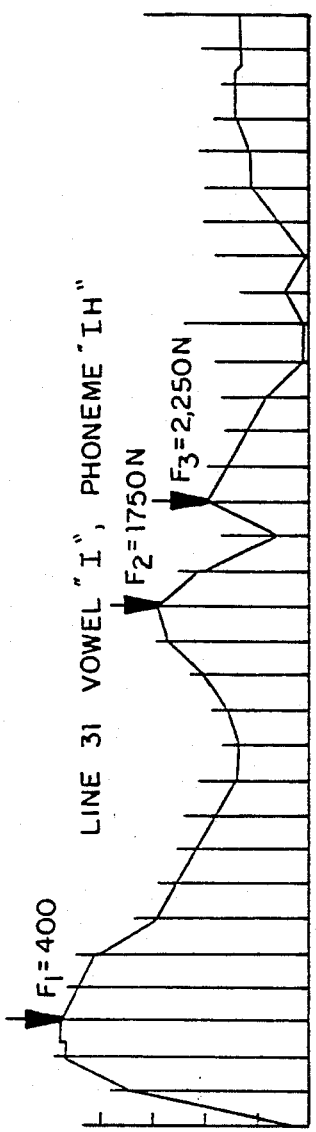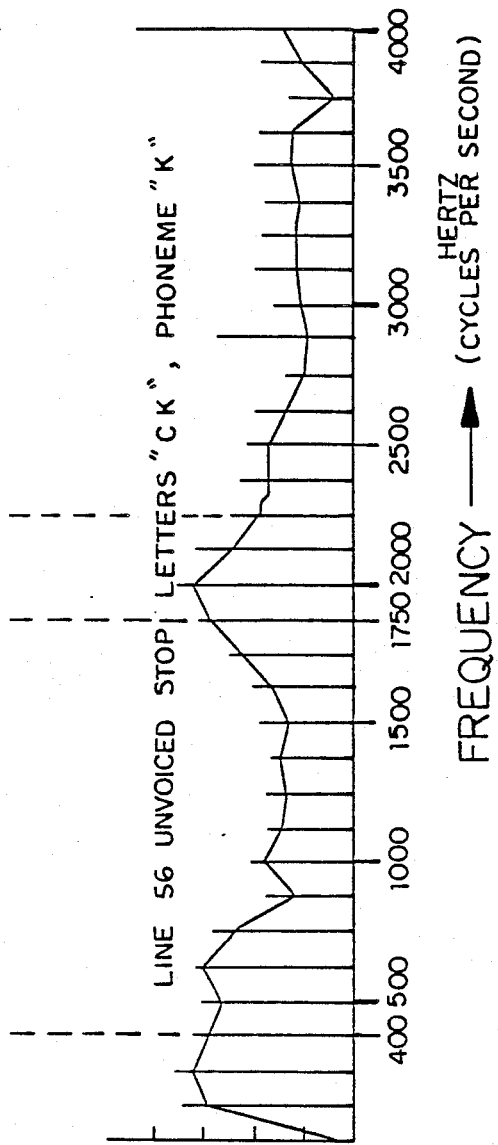
FIG. 6A
FIG. 6B
FIG. 6C

REAL TIME COMPUTER SPEECH RECOGNITION SYSTEM

FIELD OF THE INVENTION

This invention relates to a digital apparatus and method for automatically identifying the phonemes in continuous speech and providing an output therefrom text in a natural language.

BACKGROUND OF THE INVENTION

For many years there has been interest in the possibility of having a machine to recognize speech. Discrete-speech recognition devices have been proposed which can recognize individual words separated by distinct periods of silence. These devices have a disadvantage of not being able to recognize naturally spoken continuous speech. Connected speech recognition devices have been proposed which are intended to decipher words in a short phrase or sentence composed of a selected set of words. Most of these devices require that samples of the individual's speech be provided to the device in advance. All such devices have a limitation on the allowable number of words in the vocabulary, when the devices are still intended to be able to operate in real time.

Heretofore, there has not been a device which could recognize the continuous speech of an arbitrary person speaking with virtually any accent and which is not limited as to the allowable number of words in the vocabulary. An essential feature of such a device is that it be able to recognize accurately and reliably the phonemes in continuous speech. There have been several methods proposed for identifying the phonemes in speech. Such methods have involved the comparison of a segment of the acoustic signal with reference templates or models of the phonemes in the language being spoken in order to determine a best match. Reference templates that yield highly accurate phoneme identifications have not been achieved because, on the one hand, it has been burdensome to implement the large number of individual templates required to represent the range of speech which occurs in a population; and, on the other hand, approximating a range with a wieldy number of templates leads to unacceptably high rates of errors in identification.

Vocabulary size has been another barrier to automatically transcribing continuous speech into text. In the prior art, the list of words and the order in which they were allowed to be spoken has been prescribed because uncertainty in phoneme identification has been compensated for by application of grammatic, semantic, and/or syntactic rules to assist in word identification. This approach has led to the employment of very cumbersome and time-consuming network calculations which jeopardize response time within the generally accepted definition of real time response of 0.3 seconds.

Reference is made to David T. Griggs, U.S. Pat. No. 4,435,617, granted Mar. 6, 1984. This patent is similar to some other prior efforts as discussed above, in that the phonemes are intended to be recognized by analog circuits. In addition, the Griggs patent proposes use of "syllabits" which constitute a consonant followed by a vowel, with 377 of these syllabits being employed to make the most likely words. However, this system has the complications and problems as mentioned hereinabove.

Accordingly, a principal object of the present invention is to provide real time translation from speech to a natural language without the difficulties and problems as outlined hereinabove.

SUMMARY OF THE INVENTION

In accordance with an important aspect of the present invention, the frequency spectra of successive segments of an audio signal are analyzed, and the formants, or the maximum amplitude points in each of these frequency spectra, are determined. The phonemes are then identified through mathematical logic, as applied to the representations of the amplitude versus frequency spectrum, and sub-categories or sub-groups of the phonemes are identified. Following identification within a class or sub-class of phonemes, the formants of the phoneme are mathematically related to determine which individual phoneme within the sub-category, is being sampled.

From another standpoint, a specific illustrative overall system may include initially, (1) arrangements for translating input audio signals into corresponding electrical signals, (2) an analog-to-digital converter having a sampling rate which may, for example, be from about 2 times to 8 times the maximum frequency of interest, e.g. 32 KHz, and (3) spectrum analyzer arrangements which accept a short duration segment of the signal which may be from about 1 millisecond to 16 milliseconds in length, and which segment includes a set of output signals from the analog-to-digital converter, and provide an output amplitude versus frequency digital spectrum analysis for each of these 1 millisecond to 16 millisecond intervals, (4) A logical phoneme classifier is then provided to identify sub-groups of phonemes and transitions between successive phonemes. As a next step, (5) the formants in each sub-category are mathematically analyzed in a process corresponding to plotting the frequency of the first formant against that of the second formant, for example, and determining if their intersection point falls within an area uniquely identifying the phoneme, or whether other combinations of formants must be used in order to uniquely identify the phoneme. (6) The phonemes are then formed into a phoneme string, with the transitions deleted.

This string of phonemes can be used in a number of ways. One important use of this invention is to transmit appropriately coded (possibly encrypted) phonemes over communications media such as telephone or radio. The phonemes recognized at the receiving end can be directly snythesized into voice or can be further processed. Since the string of phonemes is the minimum amount of information necessary to describe speech, there can be considerable reduction in the frequency bandwidth required to transmit speech in this reduced form, e.g. continuous voice communication at less than 100 bits per second is possible. If encryption is necessary, it can be done much faster with the reduced amount of information offered by this invention. Furthermore, recording and storage or retrieval of speech can be much more efficient.

Other important uses of this invention include translating the phoneme string into phonetically spelled words in a natural language such as English whence it can be synthesized into voice, displayed on a screen, printed or further processed. This provides the capability to recognize the continuous speech of arbitrary speakers for which no device exists today, i.e., it provides a speaker-independent, continuous-speech system. Further processing could include translation into another language. This would permit one to speak into a device in one language and have output—including voice—promptly in another language without human intervention.

In the identification of sub-groups of phonemes, in accordance with one aspect of the invention, the general characteristics of these sub-groups are employed. Thus, for example, stops are identified by a relatively high amplitude, high frequency, broad band signal, preceded by a silence for an unvoiced stop, such as a "P"; or preceded by a voicing bar or very low frequency signal, for a voiced stop, such as a "B". Another class of phonemes is the unvoiced fricatives, such as "S" and "TH". The five unvoiced fricatives have a characteristic wide band sound lasting up to about 100 milliseconds. The remaining classes of phonemes include Vowels, Liquids, Nasals and Voiced Fricatives. The fifth class comprises dipthongs and affricates, which are combinations of phonemes from the first four classes.

The present invention has the advantage that it can physically be implemented by modern digital data processing circuitry to provide a real time text output from speech.

Other objects, features, and advantages of the invention will become apparent from a consideration of the following detailed description and from the accompanying drawings.

BRIEF DESCRIPTION OF THE DRAWINGS

FIGS. 4A and 4B form a table setting forth the output from the spectrum analyzers of FIG. 1, relating to a predetermined exemplary word;

FIGS. 6A, 6B, and 6C are plots of amplitude versus frequency for three of the samples included in FIGS. 4 and 5;

DETAILED DESCRIPTION

Figure 1:
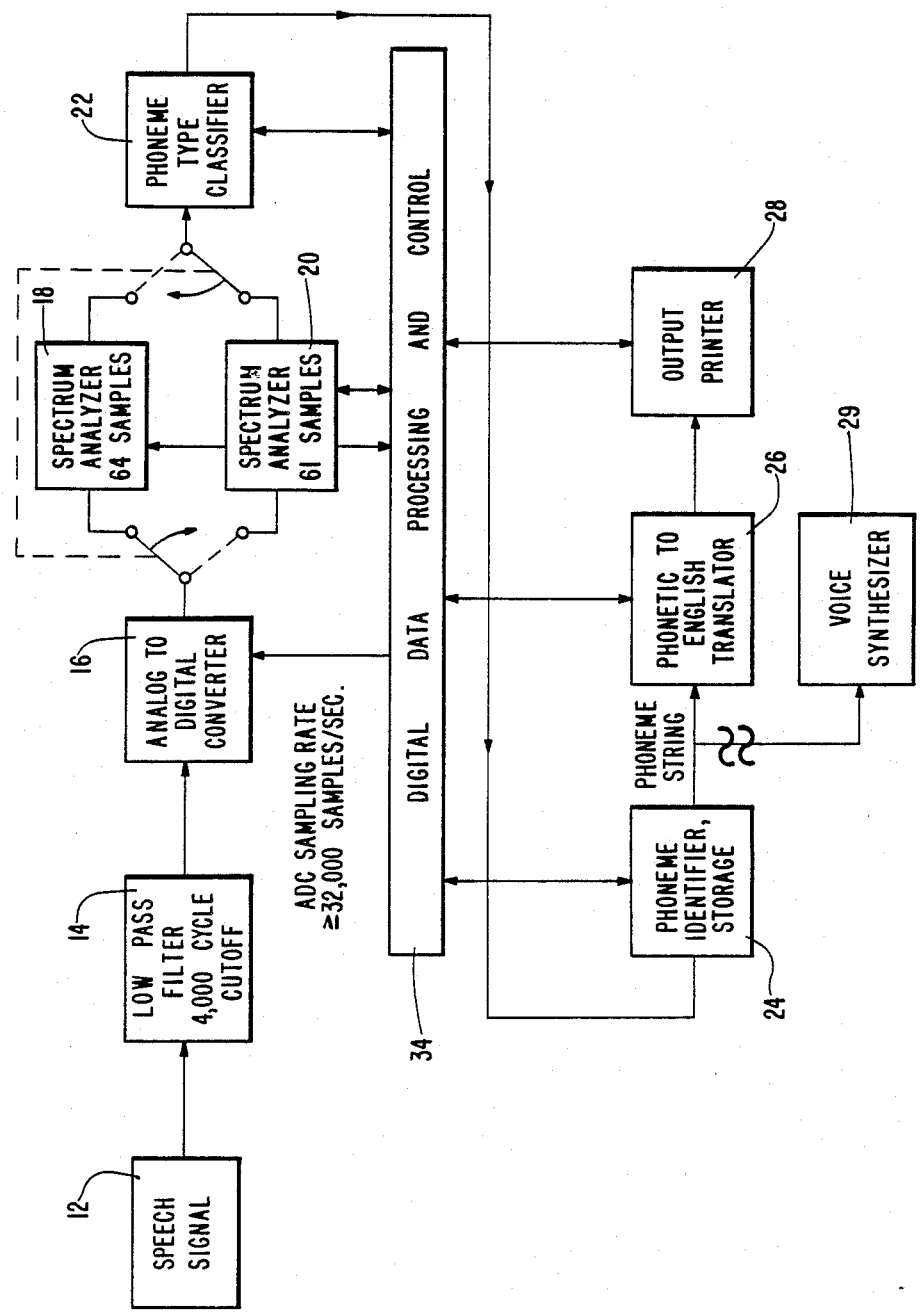
FIG. 1 is a block circuit diagram of a system for digitally and automatically transcribing speech into a natural language, or text, in real time, and illustrating the principles of the present invention.

As mentioned above, FIG. 1 is a block diagram of a system for automatically recognizing and printing or displaying speech in real time. The speech input 12 may be a microphone, recording device, telephone, or other such device capable of transmitting the acoustic spectrum of speech, either as an analog or digital signal.

The speech signal from block 12 may be fed through conditioning system 14 such as a filter that might remove all frequencies above some maximum frequency, e.g. 4 KHz. This conditioning system could have filters or other means (such as microphones for detecting unwanted sounds) for reducing unwanted signals such as noise, music or the sound of machinery. Although many other conditioning systems are possible, none may be necessary. The speech signal from circuit 14 may be fed to one or more analog-to-digital converters 16. This converter examines the audio signal for short time intervals and produces a digital output describing either the instantaneous or the time averaged amplitude of the audio signal during each successive time interval sampled. If the maximum frequency of interest is 4 KHz, the converter 16 might be operated with a time interval of 125 microseconds per sample (8,000 samples per second) in order to get at least a few samples per cycle at all frequencies of interest. The digital information from converter 16 is stored for use by one or more spectrum analyzers 18 and 20. Each analyzer 18 would take information representing amplitude vs. time over some specified time interval (e.g. 16 samples from the analog-to-digital converter 16) and change this information into amplitude vs. frequency over a specified analyzed frequency band (e.g. 100 to 4000 Hz). Thus, if the converter 16 measured 8000 samples per second (125 microsecond sample) and the analyzer 18 analyzed the signal during a time interval containing 16 samples, then the analyzer 18 would have to produce a spectrum of amplitude vs. frequency every 2 milliseconds. The time interval must be long enough so that a reasonable number of spectrum analyzers 18 and 20 can keep up with the speaker. Spectrum analyzers can be designed to produce a spectrum with over 50 frequencies in less than 1 millisecond. Although spectrum analyzers are essential to this invention, they may require neither the analog-to-digital converter 16 nor the signal conditioning system 14 as spectrum analyzers may be used which are able to accept speech signals 12 directly in analog form.

Thus, for example, with circuits 14 and 16 being omitted, the spectrum analyzers 18 and 20 could be of analog form. One of many possible implementations would include a multiplicity of narrow band pass circuits to which the input electrical signal (derived from audio) may be applied in parallel. Alternatively, input signals in digital form (derived from audio) may be applied directly to the spectrum analyzer circuits 18 and 20 of FIG. 1.

As discussed below, there are 39 phonemes which may be employed to represent the English language, and these may be divided into various groups or classes. For example, certain phonemes are known as "stops" and these may be divided into unvoiced stops, such as the letters "P", "T", and "K"; and voiced stops, including the letters "B", "D", and "G". Another class of phonemes are unvoiced fricatives, including, for example, the phoneme "F" and "TH". Other classes of phonemes include vowels, semi-vowels, and voiced fricatives. In addition, transitions between phonemes may be recognized by the changing amplitude vs. frequency pattern associated with such transitions which extend between successive phonemes resulting from the re-formation of the human speech producing parts toward the next phoneme.

Turning back to FIG. 1, the next step in the system is phoneme classification accomplished by the block 22. The steps involved in phoneme classification will be developed in greater detail in connection with FIG. 8 of the drawing. From the phoneme classifier, the next step is to identify the particular phoneme included within the broad class, and this is accomplished by the phoneme identifier 24. The step or steps involved in the phoneme identification will be developed in greater detail in connection with FIG. 9 of the drawings, in which the successive formants of a phoneme are examined and the relationship of the second formant to the first formant and the inter-relationships of other formants is employed to uniquely identify which of the phonemes within the previously identified class is actually present.

From the phoneme identifier 24, a string of phonemes, with most silences and all transitions omitted, is routed to the phonetic-to-English translator 26, and the resultant English text is printed out by the printer unit 28.

Instead of applying the phoneme string directly from circuit 24 to circuit 26, the phoneme string may be stored in circuit 24 or transmitted over radio or other communication links to circuit 26. Also, the voice synthesizer 29 may receive the phoneme string from circuit 24 either concurrently with its application to circuit 26 or separately.

Figure 2:
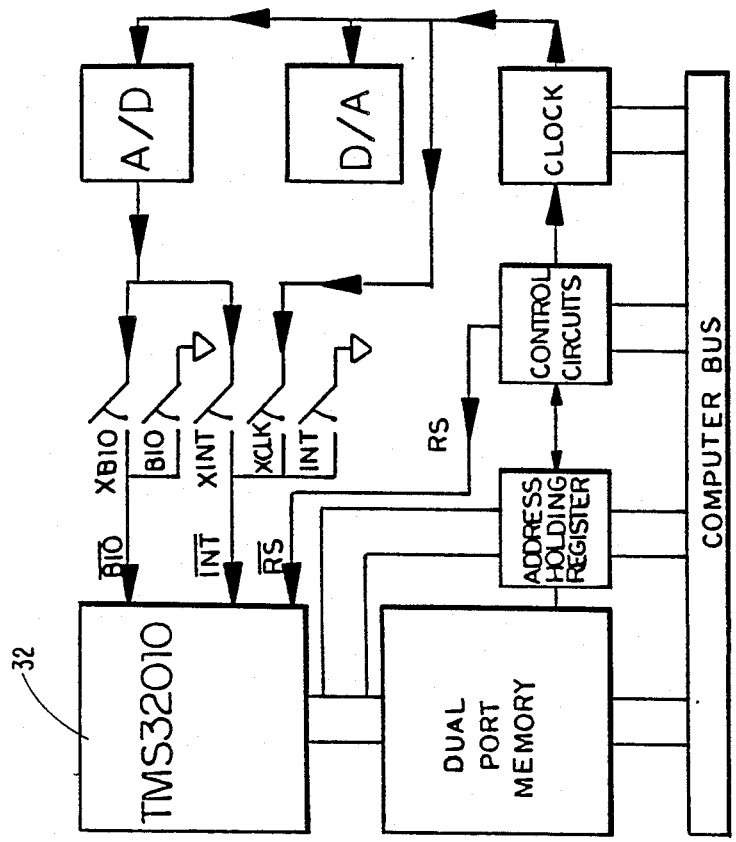
FIG. 2 is a block circuit diagram of a circuit board for performing spectrum analysis, and for providing a digital analysis of the frequency spectrum of signals supplied to it.

FIG. 2 is a block circuit diagram of a printed circuit board which may conveniently be employed for forming the analog-to-digital conversion as indicated by the block 16 in FIG. 1, and the spectrum analysis indicated by the block 18 or 20 in FIG. 1. In practice, one or more of the printed circuit boards as shown in FIG. 2 may be employed, one to implement the spectrum analyzer 18, and the other to implement the spectrum analyzer 20, in order to achieve real-time performance as discussed hereinabove. The spectrum analysis is accomplished by the Texas Instruments chip designated by the Part No. TMS 32010, and the reference numeral 32 in FIG. 2 of the drawings. The printed circuit board as shown in FIG. 2 may be purchased from Atlantic Signal Processing, Inc., and the Part No. is 320/PC. The printed circuit board of FIG. 2 is intended for plug-in use with a computer system, and this is indicated schematically by the bloc 34 in FIG. 1, with which the other digital circuits in the system are associated. The spectrum analysis is accomplished by the circuit board of FIG. 2 and particularly by the chip 32. There are several methods of spectrum analysis that are suitable for use in this circuit by chip 32 including fast Fourier transforms, linear predictive coding, digital filtering, zero crossing determination, or combinations thereof. The fast Fourier transform process will be used as the exemplar for discussion though other methods are also applicable. A reference book which is useful in the use of the TMS 32010 chip and circuit board of FIG. 2 is authored by two Texas Instruments, employees, and is entitled "Development Support Reference Guide; DFT/FFT and Convolution Algorithms, by C. Burrus and T. W. Parks, John Wiley and Sons, Copyright 1984."

Figure 3:
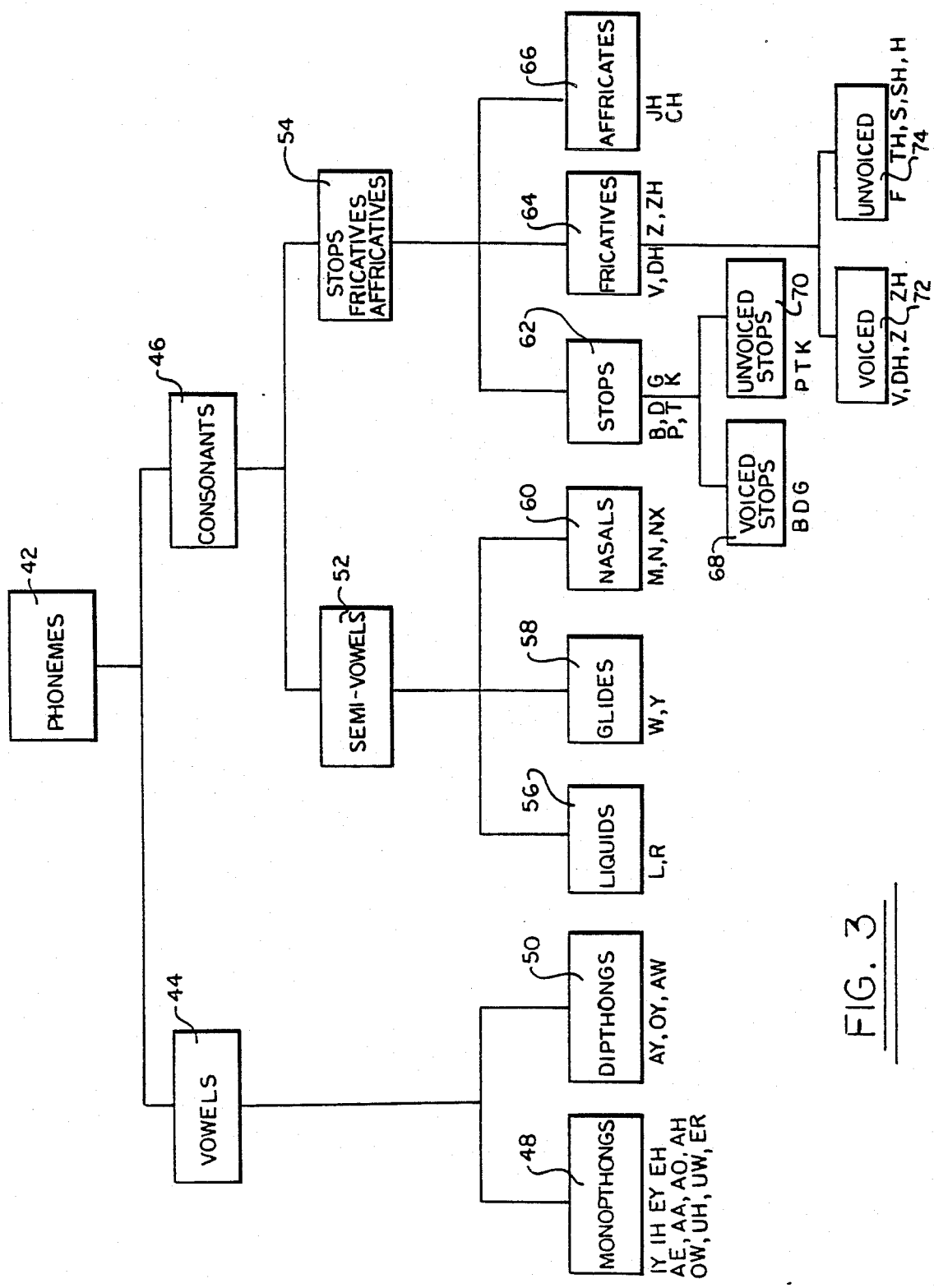
FIG. 3 is a diagram showing the 39 phonemes by which English language speech may be analyzed.

Switching to FIG. 3, a diagram of various classes of phonemes is set forth, with the broad class of phonemes as indicated by block 42 being initially broken down for the purposes of this analysis into vowels as indicated by block 44 and consonants indicated by block 46. The vowels are divided into monopthongs, as indicated by block 48 and dipthongs as indicated by the block 50. The class of consonants 46 may be divided into two sub-classes indicated by the blocks 52 and 54. The block 52 is designated semi-vowels and it includes the so-called "liquids" 56, the "glides" 58, and the "nasals" 60. The remaining consonants as indicated by the block 54 include the "stops" 62, the "fricatives" 64, and the "affricates" 66. The stops 62 are subdivided into the voiced stops 68 including the phonemes "B", "D", and "G", and the unvoiced stops 70 including the phonemes "P", "T", and "K". Similarly, the fricatives are divided into voiced fricatives 72 and unvoiced fricatives 74, with the particular voiced and unvoiced fricatives being indicated adjacent the blocks 72 and 74, respectively. In FIG. 3, 39 phonemes are identified. It should be noted that other analysts may use a few more or less phonemes, and various foreign languages may include different phonemes and different numbers of phonemes.

Figure 4A:
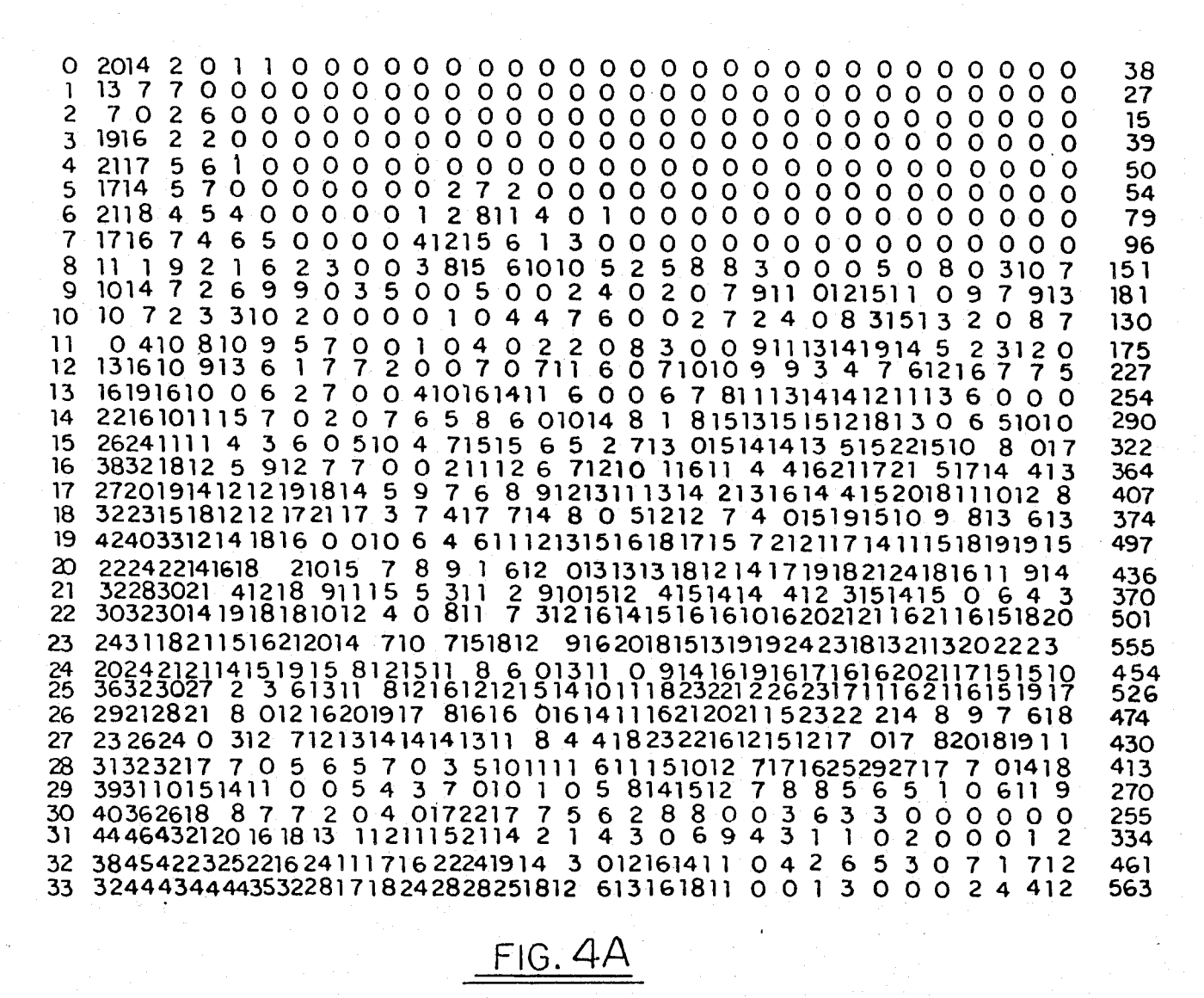
Figure 4B:
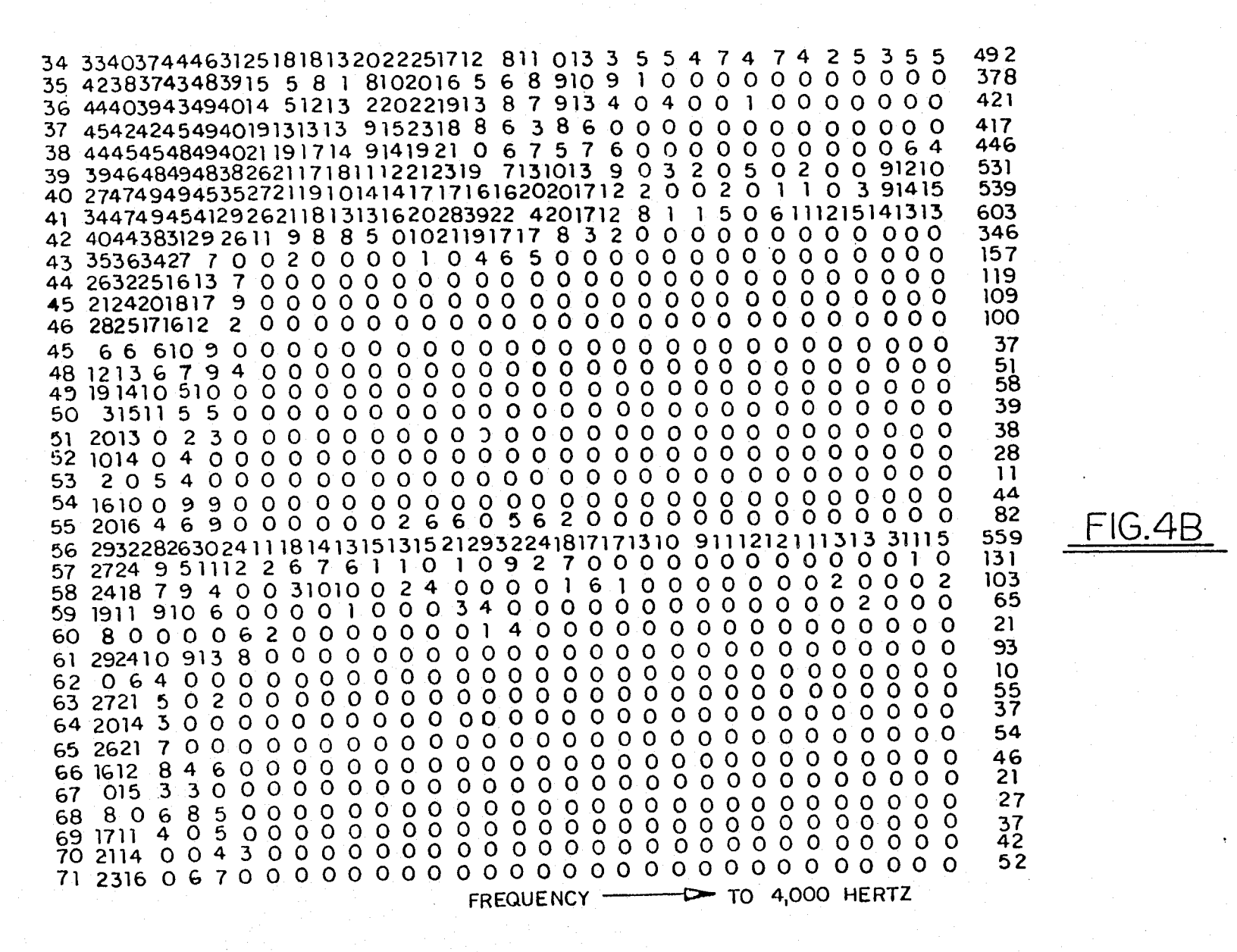

Turning now to FIGS. 4A and 4B, an example of the output from spectrum analyzers such as those shown at 18 and 20 in FIG. 1 of the drawings, is shown in tabular form. In this case, 72 segments designated from 0 to 71 have been analyzed, and the amplitude in each of 32 frequency bands extending from left to right in FIGS. 4A and 4B, and from 0 to 4,000 Hz in 125 Hz bands is set forth. The segments were taken during successive 8 millisecond intervals, and the analysis involves the spoken word "SICK". The column spaced to the right in FIGS. 4A and 4B represents the sum of the amplitudes in each of the frequency bands included in the body of the table, and this figure is useful in identifying plosives, for example.

Figure 5:
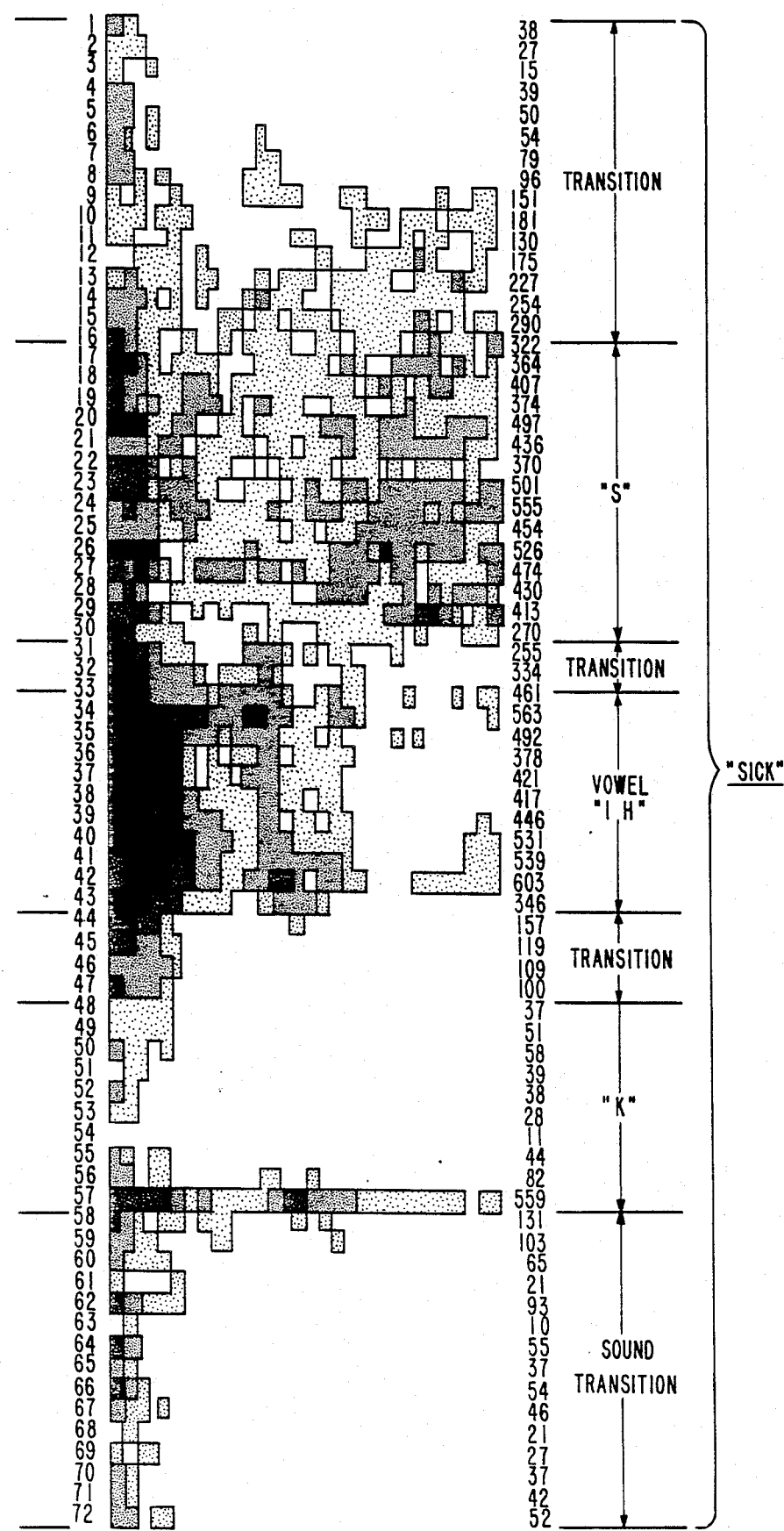
FIG. 5 is a visual representation in terms of density, of the table of FIGS. 4A and 4B.

FIG. 5 is a visual representation of the tabular material set forth in FIGS. 4A and 4B with the intensity of darkness indicating the amplitude of the signal. The graphic presentation is easier to interpret visually than are the multitude of numbers in FIGS. 4A and 4B; however, it is noted that the digital processor employs the numerical representation. The graphic presentation is for convenience in presentation but is less precise.

As mentioned above, the word which is being analyzed in FIGS. 4A and 4B and 5 is the word "SICK". The word "sick" includes 3 phonemes which are the unvoiced fricative "S" the vowel phoneme "IH" and the unvoiced stop "K". In reviewing FIG. 5, it is interesting to note the nature of the frequency bands associated with each type of phoneme. Initially, during the first few sampling intervals up to about No. 16, the spectrum is changing so rapidly that it is clearly a transition zone. The "S" phoneme starts at about sample No. 17 and is a fairly steady unvoiced fricative, characterized by a relatively broad band frequency spectrum, with emphasis in the high frequency range. Following about sample No. 30, to sample No. 33 is a transition area, and then the vowel phoneme sound "IH" appears. Following termination of the vowel sound at about sample No. 43, there is a short transition period for approximately 4 or 5 samples and then very low amplitude interval which is essentially silence, preceding the plosive which occurs in sample period 56. The plosive is a wide band very short phoneme which has a relatively high total amplitude. The total amplitude is at level 559, as indicated in FIG. 5, and this is one of the higher total amplitudes of the entire sample. Because the plosive was preceded by silence, it is an unvoiced stop. As indicated in FIG. 3, it is either a "P", a "T" or a "K". By the formant analysis technique, to be discussed hereinbelow, it will be determined that it is the "K" phoneme. FIG. 5 closes with a fairly long transition, as it started.

FIGS. 6A, 6B and 6C are plots of relative amplitude versus frequency for the three phonemes, "S", "IH" and "K", discussed hereinabove, and which were represented in samples 23, 41, and 56. It may again be noted that the unvoiced fricative "S", as shown in the plot of FIG. 6A is a broad band plot with emphasis in the high frequency range. Concerning the phoneme "IH" which appears in FIG. 6B, it may be noted that it has several well defined peaks, or formants, which are designated $F_1$ at 400 hertz, $F_2$ at 1750 hertz, and $F_3$ at 2,250 hertz. As will be discussed hereinbelow, these formants may be employed to uniquely identify individual phonemes, once the group or sub-group is identified.

Figure 7:
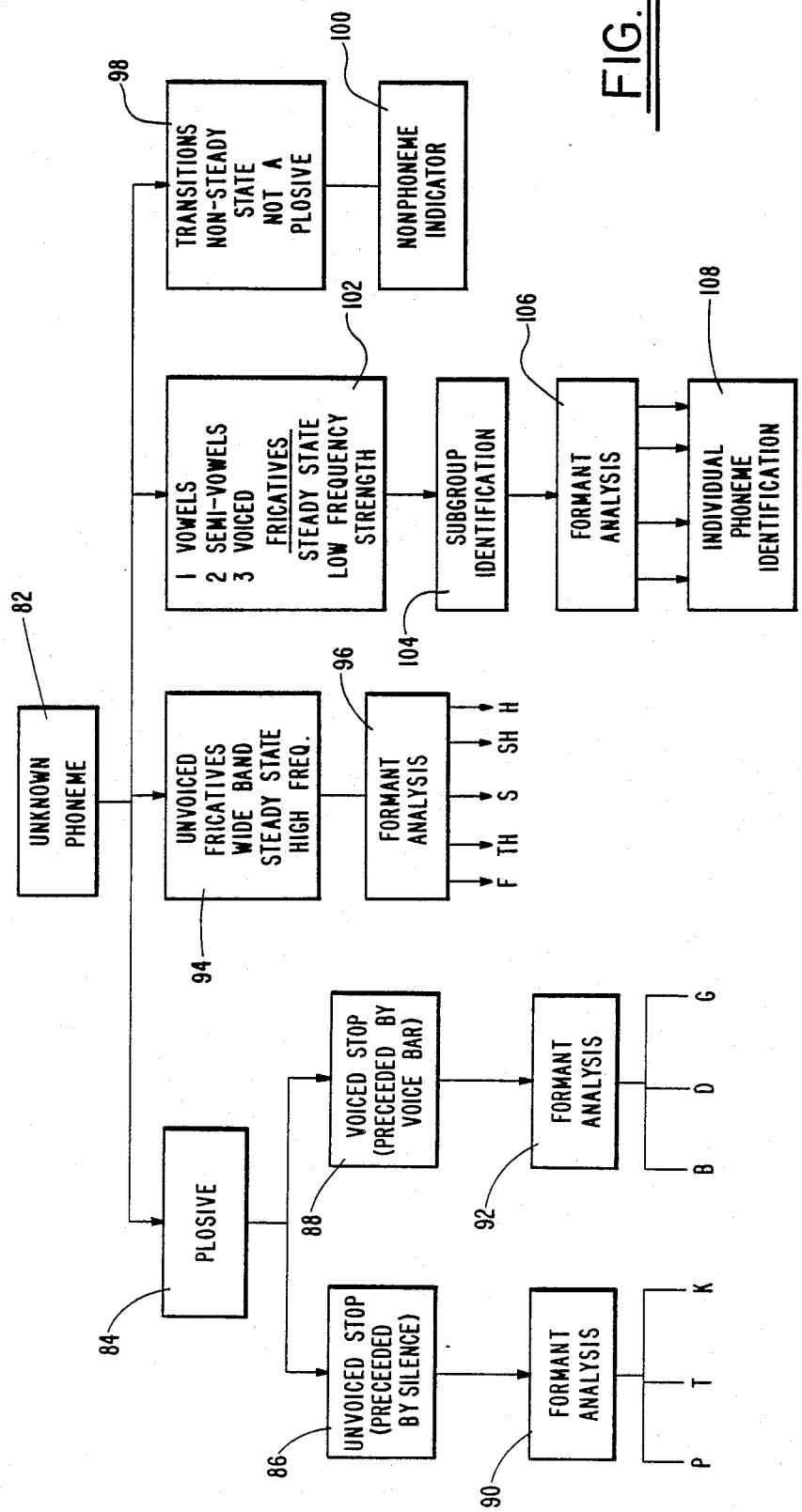
FIG. 7 is a diagram indicating the steps employed in identifying unknown phonemes.

FIG. 7 is a diagram indicating the steps in digitally identifying the individual phonemes. In FIG. 7, starting with the unknown phoneme represented by the block 82, plosives as indicated by the block 84 may be readily identified by a very high intensity signal with a short duration, such as indicated hereinabove in connection with the "K" sound. Unvoiced stops, as indicated by block 86 in FIG. 7 are preceded by silence as mentioned above in connection with the identification of the phoneme "K". Voiced stops as indicated by the block 88 are preceded by a voice bar, or a low frequency fairly high amplitude signal which lasts for several intervals. Following identification of the sub-group such as "voiced stops" or "unvoiced stops", the individual phonemes may be identified by formant analysis, as indicated by blocks 90 and 92 in FIG. 7, with this type of analysis to be discussed in some detail hereinbelow.

Unvoiced fricatives, as indicated by block 94, may be recognized by the wide band steady state nature of the frequency response characteristic, with a significant level of the signal being located at the high frequency end of the band. In this connection the characteristic for the phoneme "S" of FIG. 6A may be recalled. Following identification of the class of phoneme, the individual phonemes may be identified by formant analysis as indicated by block 96.

Transitions, as indicated by block 98 are normally characterized by significant changes in the frequency characteristic, from sampling interval to sampling interval. In addition, they do not have the high volume or amplitude of a plosive. As will be developed hereinbelow, these are not phonemes and will be deleted from the phoneme string employed for identification of words.

The next classification, when the other classes have been identified is the class including vowels, semi-vowels, and voiced fricatives, as indicated by the block 102. This class is characterized by steady state, and relatively high amplitudes at low frequencies. Certain sub-groups included within this broad class are then identified, and typical sub-groups which may be identified are the nasals, the dipthongs, and phonemes such as "CH" and "JH" which are combinations of two other phonemes, immediately following one another. Following sub-group identification as indicated by block 104, individual phonemes are identified by formant analysis as shown at block 106 with the individual phoneme identification being indicated at block 108.

Figure 8:
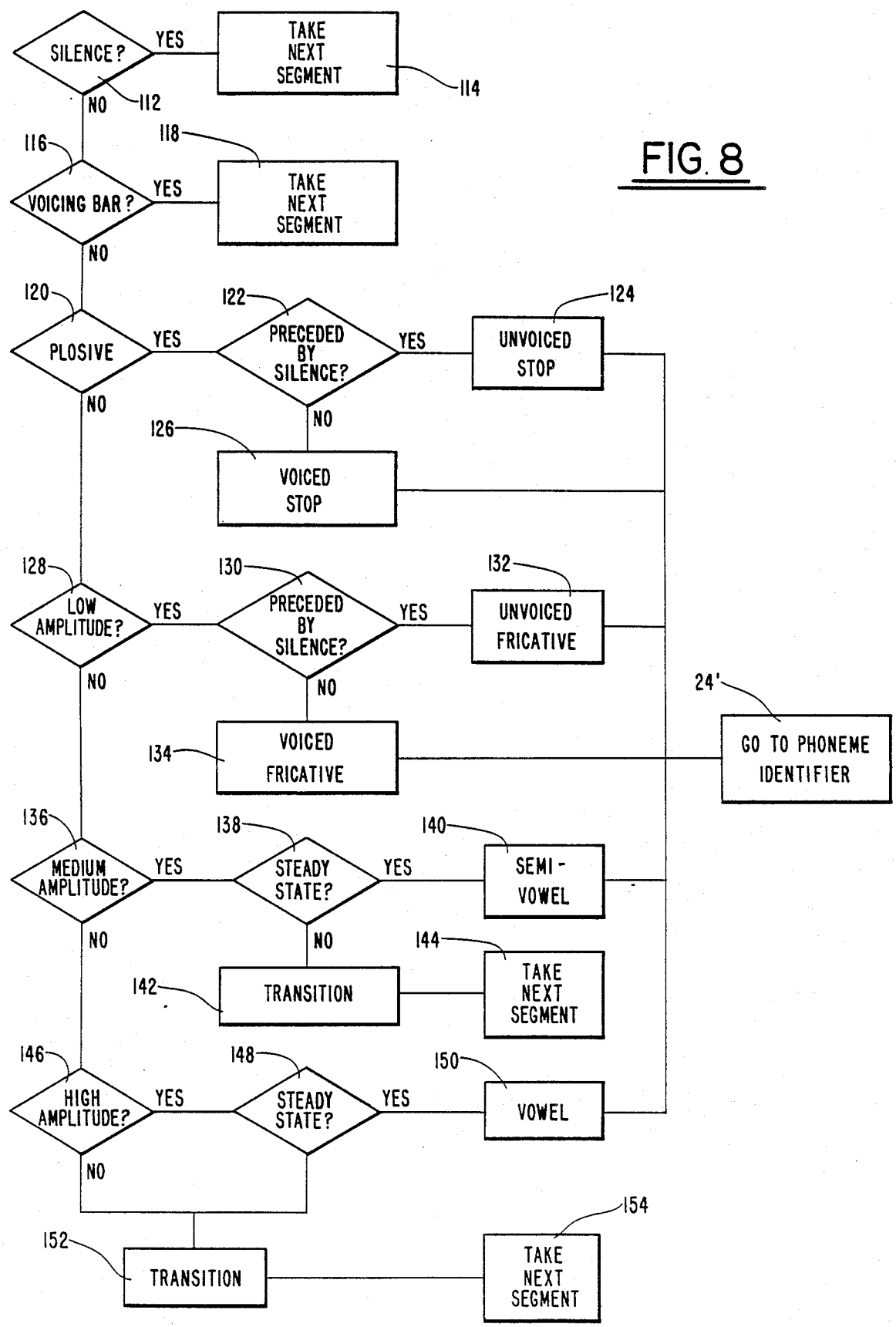
FIG. 8 is an alternative program diagram indicating the successive steps which may be taken to identify the phonemes.

FIG. 8 is a program diagram of the operation of a phoneme type classifier as indicated at block 22 in FIG. 1 of the drawings. Initially, block 112 inquires as to whether or not the segment is silent. If the answer is "yes", then the fact is noted and we proceed to take the next segment as indicated by block 114. A "no" answer leads to the question 116 as to whether or not a "voicing bar" signal is present which is a very low frequency spectral pattern. If the answer is "yes", then that fact is noted and the next segment is taken as indicated by block 118. A "no" answer leads to the inquiry 120 asking whether a "plosive" has occurred. If "yes", then the diamond 122 inquires as to whether it was preceded by silence or not. If "yes", then an unvoiced stop is identified as indicated by block 124 and we proceed to the phoneme identifier block 24', corresponding to the phoneme identifier 24 of FIG. 1. If the answer to the question of diamond 122 is "no", this indicates that we have had a voiced stop as indicated by block 126, and we again proceed to the phoneme identifier 24' to determine which voiced stop was present, normally by formant identification and analysis. If the answer to diamond 120 is "no", —it is not a plosive—we proceed to diamond 128 and ask whether or not the segment is of low amplitude. If the answer is "yes", then we proceed to diamond 130 and ask whether the segment was preceded by silence. If yes, then this indicates an unvoiced fricative as shown by block 132. We then proceed to the phoneme identifier 24' to determine which unvoiced fricative is present. If the segment was not preceded by silence, then it represents a voiced fricative as shown in block 134. Proceeding to 24' we determine which voiced fricative is present. If the answer to diamond 128 is "no", we proceed to diamond 136 which inquires as to whether the sound is of medium amplitude. If the answer is "yes", tests whether it is also steady-state. If "yes", again the sound is identified as a semi-vowel as indicated by block 140 and we proceed again to the phoneme identifier 24' which determines which semi-vowel. If the formants in the sound are not steady-state it is identified in block 142 as a transition between phonemes and the next segment is taken to be tested as shown in block 144. If the answer to diamond 136 is "no", a test is made as shown in diamond 146 as to whether the signal is of high amplitude. If "yes" and if it is also steady-state according to the test of diamond 148, it is identified as a vowel as indicated by block 150 and the phoneme identifier 24' will determine which vowel. If either of the answers to the questions asked in diamonds 146 and 148 are negative, then the sound is identified as a transition as shown by block 152 and the next sample is taken as indicated by block 154.

The phoneme identifier 24 may identify individual phonemes based on the relationship between the formants or peaks in the amplitude versus frequency spectrum. In this connection, reference will be made to FIG. 9 which shows the relationship between the first two formants of selected vowel phonemes, for a large number of speakers including men, women and children. Reference is also made to FIG. 6B which is the amplitude versus frequency characteristic for the phoneme "IH" representing the letter "i" sound in the word "SICK". Referring first to FIG. 6B, it may be noted that the first two formants or amplitude peaks occur at approximately 400 Hz and at approximately 1750 Hz, respectively. Now, turning to FIG. 9, the first formant is plotted along the horizontal axis, and the second formant is plotted along the vertical axis, with the line 156 corresponding to the first formant at 400 Hz, and the line 158 in FIG. 9 corresponding to the second formant at 1750 Hz. These two formants intersect at point 160, within the area 162, corresponding to the phoneme "IH".

Figure 9:
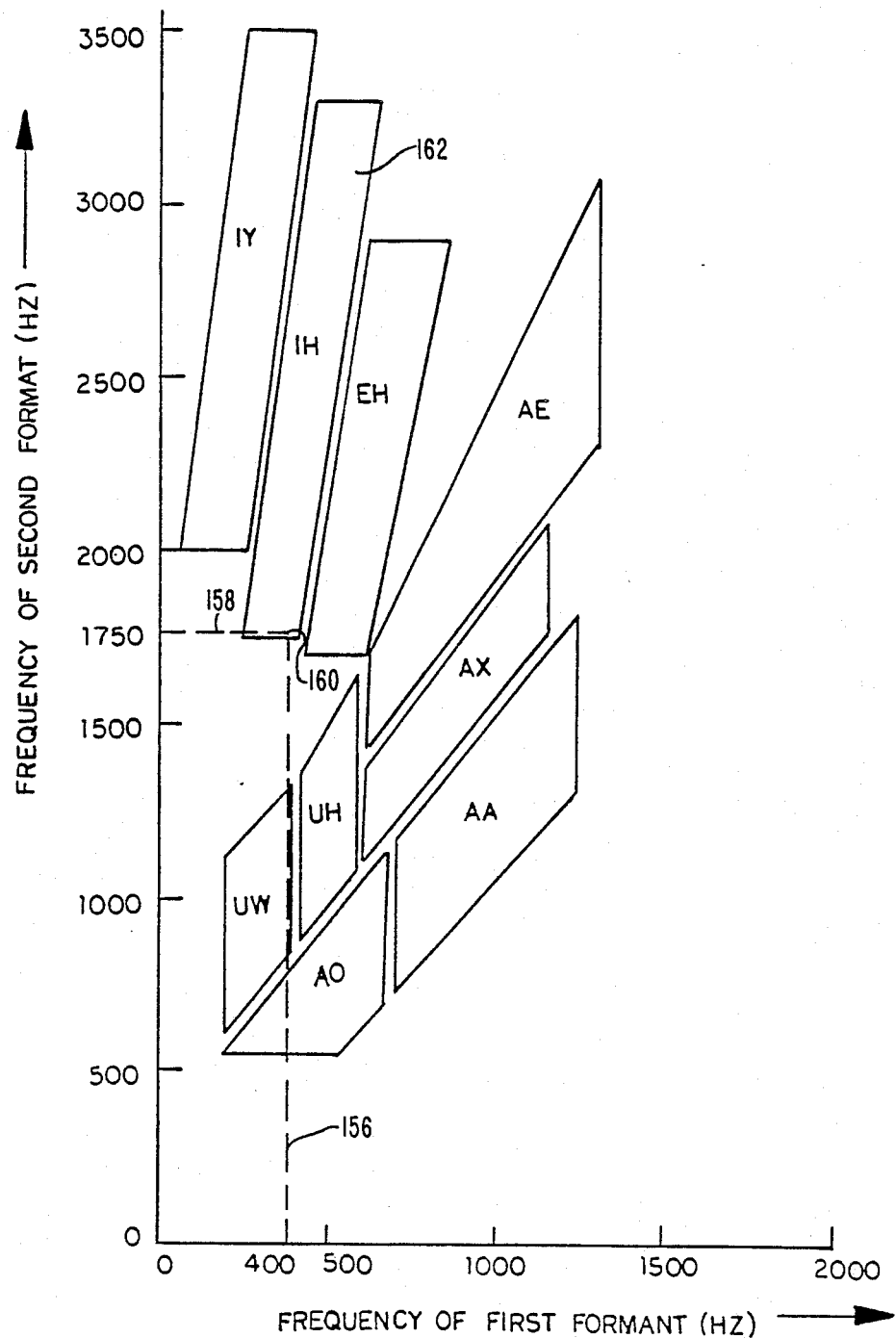
FIG. 9 is a diagram showing the frequency of the second formant plotted against the frequency of the first formant, for selected vowel phonemes.

Incidentally, all other vowel phonemes have similar areas representing the relationships between the first and second formants, some of which are set forth in FIG. 9. The relatively large areas of these formant relationships has made it difficult in prior art systems to identify phonemes as spoken by many voices.

The boundaries of the areas such as the area 162 in FIG. 9 can be mathematically identified by equations, and a mathematical determination is made as to whether or not the intersection of the formants $F_1$ and $F_2$ are within predetermined formant areas. Alternatively, this process could be accomplished using a look-up table, or by some similar technique. Thus, unlike many prior types of speech recognition systems wherein the speech of the person using the apparatus had to be presampled and recorded in the system memory, the present system is substantially independent of the tonal qualities or the accent of the user, or the origin of the speech being analyzed.

Incidentally, in some cases, the first two formants will not be sufficient to uniquely identify a particular phoneme. In such cases, in order to resolve the ambiguity, the third or higher order formants may be employed and their relationship with lower order formants mathematically analyzed in a manner similar to that for the first two formants as described hereinabove in connection with FIG. 9.

In the foregoing description, the material set forth in the drawings has been reviewed in some detail. More general considerations relating to the invention will now be discussed, with some overlap with the foregoing description.

The major characteristics of several classes of phonemes which now allow the classes to be distinguished from one another will be discussed. The first phoneme class to be addressed consist of the Voiced Stops "B", "D" and "G". Acoustically. these are characterized by an initial distinctive low frequency "voicing bar" lasting up to 100 ms or more followed by a wideband sharp plosive sound lasting approximately 10 ms followed in turn by a short duration unique set of formants lasting approximately 10 ms. The frequencies of these formants distinguish one voiced stop from the others. The Unvoiced Stops, "P", "T" and "K" are similar to the voiced stops except that the low frequency voicing bar is absent; i.e., the plosive is preceded by silence. The third class of phonemes are the Unvoiced Fricatives "F", "S", "SH", "TH" and "H". These have a common characteristic of silence followed by a wideband sound lasting up to about 100 ms. They differ from each other in the frequency range covered by the wideband sound. The fourth class consisting of the Voiced Fricatives are similar to the Unvoiced Fricatives except that they are preceded by a voicing bar. The fifth and sixth classes are the Semi-Vowels (Liquids, Nasals and Glides) and the Vowels. These two classes differ in that the Semi-Vowels have a medium amplitude signal and the vowels have a high amplitude signal. The seventh class comprises dipthongs and affricates, each of which are combinations of two phonemes from the first four classes.

The Phoneme Type Classifier 22 of FIG. 1 may be implemented in a microprocessor in which each spectral sample is tested against the criteria discussed above. An initial test for silence is made followed by a test for stops. The test for a voiced stop is to detect the presence of a low frequency voicing bar before occurrence of a wideband plosive. The test for an unvoiced stop is the wideband plosive occurring immediately after the silence.

The next test in the Phoneme Type Classifier is for the identification of fricatives. These phonemes have such distinctive features that it is more straightforward to identify each of them directly rather than classify first and then identify. Each of these phonemes has a wideband signal of 60 to 100 ms duration with the only difference between them being the high amplitude frequencies contained in the signal. As mentioned earlier, Voiced Fricatives are preceded by a voicing bar and Unvoiced Fricatives by silence.

A segment of signal that is not silence, a stop, or unvoiced fricative, is part of a vowel, semi-vowel, or a transition between phonemes. There also are dipthongs and affricates which are combinations of phonemes, which will be discussed later. The acoustic spectrum of these phonemes are characterized by the presence of formants; i.e., specific groups of frequencies of relatively high amplitude. The frequencies at which the formants occur are the unique identifiers of individual vowels, and semi-vowels as well as voiced and unvoiced stops and fricatives.

The mode of operation of the Phoneme Identifier 24 of FIG. 1 will now be described in somewhat greater detail. The process of identifying specific phonemes as spoken by arbitrary speakers will be described by making reference to FIG. 9 in which the relationship between the first two formants for selected vowels is illustrated. Each quadrilateral figure in the diagram encloses an area describing the range of occurrence of combinations of first and second formants such that the sound will be recognized as the phoneme identified in the figure. For example, a certain low-voiced male speaker may utter the phoneme "AE" with $F_1 = 700$ Hz and $F_2 = 1700$ Hz while a higher-voiced woman or child may have $F_1 = 1200$ and $F_2 = 2400$.

A computer program employing the logic of the method employed in the present invention uses mathematical relationships, look-up tables or other such means. First, the formants in the spectrum sample are identified. During speech, after the utterance of each phoneme the vocal tract is being reshaped in preparation for producing the appropriate sound for the next phoneme. While this "transition" is occurring, the signal spectrum is continually changing. The existence of such transitions has not been recognized and exploited in prior art and is one aspect of the present invention. The logic of the Phoneme Identifier 24 compares the spectrum of successive signals in sustained phonemes such as vowels and semi-vowels, to determine when it is in a steady state. The formants for these types of phonemes are identified during this steady state condition. The formants for stops are determined for the short duration period of the high intensity plosive sound.

Then tests are made to determine within which of the boundaries the combination of first and second formants lie. The vowel "IY" in FIG. 9 may be used as an illustration of the process which is identical for all other phonemes except of course that the boundaries are different. For "IY", the first test made is whether $F_2$ lies between 2000 and 3500 Hz. If outside it is rejected and the process goes on to the next phoneme. If $F_2$ does lie between 2000 and 3500 Hz, two other tests using equations for the other two boundaries are performed to determine if the $F_1$-$F_2$ combination also lies between the vertical sides of the trapezoid. If the tests are not passed, the process goes on to the next phoneme and is repeated until a match is found. The tests are also repeated for adjacent phonemes in which overlap of the boundaries may occur. Should there be ambiguity in the identification, similar tests are made for the third and, if necessary, the fourth formants, $F_3$ and $F_4$.

There are several phonemes that actually are combinations of other phonemes. These are the dipthongs such as "AY" and "OY" along with the affricates "CH" and "JH". "AY" is a combination of "AH" and "IY", "OY" is a combination of "AO" and "IY", "CH" is a combination of "T" and "SH", and "JH" is a combination of "D" and "Z". Each of these combination phonemes are identified by the successive occurrence of their constituents. The foregoing completes the identification of all of the phonemes.

It is one feature of this invention to be able to send voice messages over low bandwidth or low data rate communications channels. There are less than fifty different phonemes; accordingly a number representing a phoneme may be digitally encoded in eight bits or less. The phoneme string representing the speech signal may be transmitted in encoded form at about seventy-five bits per second for someone speaking at a rate of about one hundred words per minute. The phonemes may be decoded at the termination point and thence either be fed to a speech synthesizer for synthetic voice output or translated into natural language text using the Orthographic Translator described below for display or entry into an information processing system such as a word processor.

The Orthographic Translator 26 of FIG. 1 translates a string of phonemes into correctly spelled natural language. It is noted that the program logic to this point operates on short duration segments of the signal. However, phonemes can have an overall duration of 10 to 200 or more milliseconds. It is during this interval that translation is taking place. An independent, concurrently operating microprocessor may be used for this purpose. In this regard, the Data Processor and Controller 34 of FIG. 1 may use a single powerful data processor, or may represent a series of separate microprocessors. In continuous speech, words often are run together and there are no natural silences to indicate the end of one word and the beginning of another. To accommodate this factor, an algorithm is employed in the microprocessor to translate a phoneme string into correctly spelled English words. The translation algorithm employs a Phonetic-English dictionary that lists the orthographic English spellings of words corresponding to phonetically spelled words. The principle employed in the algorithm is to scan the dictionary entries to determine if sequences of words are either beginnings of, or complete, words. An example will be used to explain the operation of the algorithm using the sentence "Your order will arrive on Wednesday." The phoneme string representing this sentence is: Y:OW:-R:AO:R:D:ER:W:IH:L:AX:R:AY:V:AO:N:-W:EH:N:Z:D:EY. Y:OW:R is a word but there is no word in the phonetic dictionary beginning with Y:OW:-R:AO; therefore, Y:OW:R is the first word and the second word begins with AO. AO:R and AO:R:D:ER are both words but D:ER:W is not the beginning of another word; therefore, the second word is AO:R:D-:ER. W:IH:L is straightforward. AX and AX:R:AY:V are words but R:AX:V:AO is not the beginning of one so AX:R:AY:V is the correct one. AO:N is straightforward. W:EH:N and W:EH:N:Z:D:EY are both eligible but Z:D is not, so the correct word is W:EH:N:Z:-D:EY. Thus the string is parsed as: Y:OW:R AO:R:D-:ER W:IH:L AX:R:AY:V AO:N W:EH:N:Z:D:EY. This is translated into the correct English spelling by the corresponding entries in the Phonetic-English dictionary. A computer program to parse phoneme strings in this manner is prepared in the programming language of choice.

The present system automatically recognizes speech, and functions accurately even though various speaker's accents cause words to be pronounced differently. To accommodate this expected variation, the Phonetic-English dictionary contains, for affected English words, multiple phonetic spellings corresponding to the accents which may be encountered.

For completeness, certain mathematical parameters may be set up for the recognition of a plosive, a voicing bar, silence, unvoiced fricatives, and transitions, for example. In this regard, it is useful to divide the frequency spectrum into four bands, 01000 Hertz, 1000–2000 Hertz, 2000–3000 Hertz and 3,000 to 4,000 Hertz; and average amplitude for each frequency band is calculated. For the purpose of identifying an unvoiced stop, for example, "Unvoiced-stop-silence" could be defined as a segment in which the average amplitudes in the upper three frequency bands are very low, perhaps 0 to 10 total amplitude units, and the lowest frequency band amplitude is below 30 amplitude units.

A plosive may be recognized by its relatively high amplitude at high frequencies, with a total amplitude greater than 10 times the 40 units for "silence" i.e., more than 400 units and with a relatively brief duration such as 10 milliseconds.

A voicing bar, preceding a voiced stop, has a relatively high total amplitude, (for example more than 80 units) in the lowest frequency band, virtually no amplitude, (e.g., less than 10 units), in the upper three frequency bands and has a duration of more than 30 milliseconds.

Unvoiced fricatives may be recognized by substantial amplitudes, (e.g., more than 60 total units) in each of the four frequency bands and a duration of at least 40 milliseconds. The frequency distribution and duration of approximately identical sample spectra are indicative of the identification of individual unvoiced fricatives.

Transitions may be recognized by continuous changes in successive samples in sliding from one phoneme to the next.

Incidentally, the specific amplitude levels mentioned above are for systems compatible with the amplitudes of FIGS. 4 and 5. With other amplitude levels, and when different phoneme sets or foreign languages are used, it would be expected that different parameters including sample time intervals and amplitudes would be applicable.

In conclusion, it is to be understood that the foregoing detailed description and the accompanying drawings relate to one illustrative embodiment of the invention. Various alternative arrangements may be employed, to implement principles enunciated hereinabove. Thus, by way of example, and not of limitation, a series of microprocessors could be associated with the analog-to-digital converter, the spectrum analyzers, and the other circuits shown in FIG. 1, and could thereby implement the digital data processing in control block 34, as shown in FIG. 1. Alternatively a single larger capacity computer with greater data processing power may be employed. Concerning the output printer 28, for example, it could be a laser printer or a video screen, by way of two specific examples. For use in foreign languages, including non-human languages, different sets of phonemes may be employed, and of course, a different natural language or orthographic translator would be employed. Also, instead of an output printer, a terminal display may receive the output information, or signals may be fed directly into a communication processing system, or a data link to a remote point where the text would be displayed or printed out. Also, translations to other languages and output texts or voice may be in a language other than the input language. Instead of the two spectrum analyzers shown in FIG. 1, a higher speed and higher capacity single spectrum analyzer could be used. While the disclosed system has 39 distinct phonemes, other systems using a greater number, such as 45 phonemes could be employed, and other phonetic analysis systems could also be used. It is also noted that both digital and analog frequency analysis may be used, and the input audio signals may be translated into any non-audio form such as optical signals or either digital or analog electrical signals. Accordingly, the present invention is not limited to the system precisely as shown in the drawings and as described in detail hereinabove.

What is claimed is:

1. A real time speech recognition system comprising:
   means for receiving audio speech signals and for converting them into corresponding electrical signals having a predetermined maximum frequency of interest;
   analog-to-digital conversion means for sampling said signals at a rate at least twice as high as said maximum frequency;
   spectrum analyzer means for accepting sets of samples from said analog-to-digital converter extending over a time interval of between about two milliseconds and about sixteen milliseconds, and for providing a digital spectrum analysis of each of said sets of samples;
   means for logically analyzing said sets of samples, and for classifying the series of samples into silence, transitions, and phonemes of at least the following classes:
   (1) voiced stops, (2) unvoiced stops, (3) unvoiced fricatives, (4) vowels, semi-vowels, and voiced fricatives, and (5) transitions;
   means for mathematically analyzing the relationships between the formants of the classified phonemes to uniquely identify successive phonemes;
   said analyzing means including means for defining phoneme regions wherein, in the graphical analysis of a first one of said formants plotted against another one of said formants at least some selected boundaries of the defined regions extend over both a range of first format frequencies and a range of said other formant frequencies, and for determining the coordinates defined by the formants of each phoneme, and the region in which such coordinates fall, thereby identifying each phoneme;
   means for forming sequences of continuous strings of phonemes, eliminating transitions and silences;
   means for translating the strings of phonemes into the words of a language;
   said means for translating strings of phonemes into a language including means for parsing the phoneme string, including (1) determining alternative correct possible words from the phoneme string, (2) eliminating those alternatives which Yield subsequent non-words in the following phoneme string, and (3) selecting the remaining alternative word; and
   means for printing out text corresponding to the translated words.

2. A system as defined in claim 1 further comprising low pass filter means for limiting the maximum frequency to about 3,000 to 6,000 Hz.

3. A system as defined in claim 1 wherein said time interval is approximately from 2 milliseconds to 4 milliseconds.

4. A system as defined in claim 1 wherein said sampling rate is between about 8,000 and 32,000 samples per second.

5. A method for recognizing the phonemes in speech comprising steps of:
   converting speech into a corresponding non-audio signal usable as input to a frequency analyzer;
   producing amplitude versus frequency spectra of said signal during successive predetermined time intervals;
   analyzing said spectra and classifying the series of spectra into transitions, silence and groups of phonemes;
   determining the frequencies of the formants in the said spectra;
   uniquely identifying successive phonemes from the relationships between the formants for each of said groups of phonemes; and
   said analyzing means including means for defining phoneme regions wherein, in the graphical analysis of a first one of said formants plotted against another one of said formants, at least some selected boundaries of the defined regions extend over both a range of first formant frequencies and a range of said other formant frequencies, and for determining the coordinates defined by the formants of each phoneme, and the region in which such coordinates fall, thereby identifying each phoneme.

6. A method as defined in claim 5 wherein said speech conversion includes the reduction in amplitude of frequencies above a predetermined maximum frequency.

7. A method as defined in claim 5 wherein said speech conversion includes processing by an analog-to-digital converter with a predetermined sampling rate.

8. A method as defined in claim 7 wherein said sampling occurs at a rate between 4,000 and 64,000 samples per second.

9. A method as defined in claim 5 including the step of reducing unwanted background which may be present in said signals.

10. A method as defined in claim 5 wherein said predetermined time interval for the production of spectra is approximately 1 to 16 milliseconds in duration.

11. A method as defined in claim 5 which also includes the step of producing a string of successive phonemes.

12. A method as defined in claim 11 wherein said method also includes the step of producing indications of silence.

13. A method as defined in claim 12 wherein said string of phonemes is encoded, for storage, transmission or further processing.

14. A method as defined in claim 12 including the step of synthesizing a voice or speech output from said string of phonemes.

15. A method as defined in claim 12 including forming said string of phonemes into a stream of words by a phonetic dictionary translator.

16. A method as defined in claim 15 including the step of translating said stream of words into sentences in a natural language.

17. A real time system for recognizing the phonemes in speech, comprising:

means for converting speech into a corresponding non-audio signal usable as input to a frequency analyzer;

frequency analyzer means for producing amplitude-versus frequency spectra of said signal during successive predetermined time intervals;

means for analyzing said spectra and classifying the series of spectra into transitions, silence and groups of phonemes;

means for determining the frequencies of the formants in the said specta;

means for uniquely identifying successive phonemes from the relationships between the formants for each of said groups of phonemes;

means for translating the resultant strings of phonemes into a language; and said means for translating strings of phonemes into a language including means for parsing the phoneme string, including (1) determining alternative possible words from the phoneme string, (2) eliminating those alternatives which yield subsequent non-words in the subsequent phoneme string, and (3) selecting the remaining alternative word.

18. A system as defined in claim 17 including low pass filter means for reducing the amplitude of frequencies above a predetermined maximum frequency.

19. A system as defined in claim 17 wherein said system includes an analog-to-digital converter with a predetermined sampling rate.

20. A method as defined in claim 19 wherein said sampling rate is between 4,000 and 64,000 samples per second.

21. A method as defined in claim 17 wherein said predetermined time interval is approximately 1 to 16 milliseconds in duration.

22. A system as defined in claim 17 which also includes means for producing a string of successive phonemes.

23. A system as defined in claim 22 wherein said system includes means for producing indications of silence.

24. A system as defined in claim 23 wherein said system includes means for synthesizing a voice or speech output from said string of phonemes.

* * * * *